(12) United States Patent
Olofsson et al.

(10) Patent No.: US 9,926,507 B2
(45) Date of Patent: Mar. 27, 2018

(54) METHOD FOR MONITORING AND CONTROL OF TORREFACTION TEMPERATURE

(75) Inventors: Ingemar Olofsson, Umeå (SE); Martin Nordwaeger, Umeå (SE)

(73) Assignee: BIOENDEV AB, Umea (SE)

( * ) Notice: Subject to any disclaimer, the term of this patent is extended or adjusted under 35 U.S.C. 154(b) by 564 days.

(21) Appl. No.: 14/123,580

(22) PCT Filed: May 16, 2012

(86) PCT No.: PCT/SE2012/050529
§ 371 (c)(1),
(2), (4) Date: Mar. 18, 2014

(87) PCT Pub. No.: WO2012/158114
PCT Pub. Date: Nov. 22, 2012

(65) Prior Publication Data
US 2014/0202072 A1   Jul. 24, 2014

(30) Foreign Application Priority Data

May 18, 2011  (SE) ..................... 1150461

(51) Int. Cl.
*C10L 5/00*      (2006.01)
*C10L 5/44*      (2006.01)
(Continued)

(52) U.S. Cl.
CPC ............. *C10L 5/447* (2013.01); *C10L 9/083* (2013.01); *F26B 25/00* (2013.01); *G01J 5/025* (2013.01);
(Continued)

(58) Field of Classification Search
CPC . C10L 5/447; C10L 9/083; G01J 5/025; G01J 5/0285; G01J 5/029; G01J 5/041;
(Continued)

(56) References Cited

U.S. PATENT DOCUMENTS 3,501,380 A   3/1970  Perch
3,888,621 A   6/1975  Williams
(Continued)

FOREIGN PATENT DOCUMENTS

CN      101379167 A    3/2009
DE      30 41 627 A1   6/1982
(Continued)

OTHER PUBLICATIONS

International Search Report, PCT/SE2012/050529, dated Aug. 28, 2012.
(Continued)

*Primary Examiner* — Latosha Hines
(74) *Attorney, Agent, or Firm* — Myers Bigel, P.A.

(57) ABSTRACT

The invention relates to a method and an arrangement for precise monitoring and control of torrefaction temperature, which enables accurate control of the quality and properties of the torrefied material. The method includes determining the surface temperature of the biomass in the torrefaction arrangement is using an IR-thermometer and hot nitrogen gas a purge gas.

9 Claims, 3 Drawing Sheets

(51) Int. Cl.
*C10L 9/08* (2006.01)
*G01J 5/04* (2006.01)
*G01J 5/02* (2006.01)
*G01J 5/06* (2006.01)
*G01J 5/08* (2006.01)
*F26B 25/00* (2006.01)
*G05D 23/27* (2006.01)

(52) U.S. Cl.
CPC .............. *G01J 5/029* (2013.01); *G01J 5/0285* (2013.01); *G01J 5/041* (2013.01); *G01J 5/061* (2013.01); *G01J 5/0806* (2013.01); *G01J 5/0893* (2013.01); *G05D 23/27* (2013.01); *F26B 2200/02* (2013.01); *Y02E 50/10* (2013.01); *Y02E 50/15* (2013.01); *Y02E 50/30* (2013.01)

(58) Field of Classification Search
CPC ........ G01J 5/061; G01J 5/0806; G05D 23/27; Y02E 50/10; Y02E 50/15; Y02E 50/30; F26B 2200/02; F26B 25/00
USPC .................................................. 44/606, 629
See application file for complete search history.

(56) References Cited

U.S. PATENT DOCUMENTS

| | | | |
|---|---|---|---|
| 4,344,819 | A | 8/1982 | Gerdes, Jr. |
| 5,017,269 | A | 5/1991 | Loomans et al. |
| 5,728,361 | A | 3/1998 | Holley |
| 7,901,663 | B2 | 3/2011 | Lenglet |
| 2003/0221363 | A1 | 12/2003 | Reed |
| 2004/0148795 | A1 | 8/2004 | Bernon et al. |
| 2005/0160667 | A1 | 7/2005 | Weinberg et al. |
| 2008/0263891 | A1 | 10/2008 | Brunet |
| 2009/0007484 | A1 | 1/2009 | Smith |
| 2009/0084029 | A1 | 4/2009 | Bergman |
| 2009/0250331 | A1 | 10/2009 | Hopkins et al. |
| 2010/0083530 | A1 | 4/2010 | Weisselberg et al. |
| 2010/0101141 | A1* | 4/2010 | Shulenberger ......... C10B 47/44 44/589 |
| 2010/0162619 | A1 | 7/2010 | Peus |
| 2010/0223839 | A1 | 9/2010 | Garcia Perez et al. |
| 2010/0242351 | A1 | 9/2010 | Causer |
| 2010/0270505 | A1 | 10/2010 | Gallaspy et al. |
| 2011/0019981 | A1 | 1/2011 | Sanz Garcia et al. |
| 2011/0041392 | A1 | 2/2011 | Stromberg et al. |
| 2011/0179701 | A1* | 7/2011 | Grassi ..................... C10L 5/442 44/606 |
| 2011/0252698 | A1 | 10/2011 | Camper et al. |

FOREIGN PATENT DOCUMENTS

| | | |
|---|---|---|
| DE | 10 2005 038 135 B3 | 3/2007 |
| EP | 0 081 246 A2 | 6/1983 |
| EP | 0 081 246 A3 | 6/1983 |
| EP | 2 287 278 A2 | 2/2011 |
| EP | 2 385 096 A2 | 11/2011 |
| GB | 2448531 A | 10/2008 |
| JP | 51-114976 | 10/1976 |
| JP | 51-115205 | 10/1976 |
| JP | 55-042058 | 3/1980 |
| KR | 101012861 B1 | 2/2011 |
| WO | WO 92/17744 A1 | 10/1992 |
| WO | WO 2005/056723 A1 | 6/2005 |
| WO | WO 2007/078199 A1 | 7/2007 |
| WO | WO 2009/151367 A1 | 12/2009 |
| WO | WO 2010/001137 A2 | 1/2010 |
| WO | WO 2010/001137 A3 | 1/2010 |
| WO | WO 2010/045320 A2 | 4/2010 |
| WO | WO 2010/063029 A1 | 6/2010 |
| WO | WO 2010/068099 A1 | 6/2010 |
| WO | WO 2010089342 A1 | 8/2010 |
| WO | WO 2010/129988 A1 | 11/2010 |
| WO | WO 2010/130988 A1 | 11/2010 |
| WO | WO 2010128209 A1 | 11/2010 |
| WO | WO 2011/112526 A2 | 9/2011 |
| WO | WO 2011/119470 A1 | 9/2011 |
| WO | WO 2011/123025 A1 | 10/2011 |

OTHER PUBLICATIONS

Written Opinion of the International Searching Authority, PCT/SE2012/050529, dated Aug. 28, 2012.
International Preliminary Report on Patentability, PCT/SE2012/050529, dated Nov. 19, 2013.
Arias B. et al. "Influence of torrefaction on the grindability and reactivity of woody biomass", Oct. 23, 2007 Elsevier B.V., *Fuel Processing Technology*, vol. 89, No. 2, 169-175, (2008).
Chinese First Office Action Corresponding to Chinese Patent Application No. 201280029970.3, dated Aug. 20, 2014, English Translation, 7 Pages.
Chinese First Office Action Corresponding to Chinese Patent Application No. 2012800298151; dated Sep. 4, 2014, English Translation, 8 Pages.
European Search Report Corresponding to European Patent Application No. 12 786 568.1; dated Sep. 8, 2014; 8 Pages.
European Search Report Corresponding to European Patent Application No. 12 785 686.2; dated Sep. 8, 2014; 6 Pages.
European Supplementary Search Report Corresponding to European Patent Application No. 12 78 4918.0; dated Feb. 4, 2015; 5 Pages.
European Supplementary Search Report Corresponding to European Patent Application No. 12 78 6558.2; dated Feb. 6, 2015; 7 Pages.
International Preliminary Report on Patentability Corresponding to International Application No. PCT/SE2012/050531; dated Nov. 19, 2013; 6 Pages.
International Preliminary Report on Patentability Corresponding to International Application No. PCT/SE2012/050534; dated Apr. 24, 2013.
International Preliminary Report on Patentability for PCT/SE2012/050527: Date of Completion Mar. 13, 2013, 12 Pages.
International Search Report and Written Opinion Corresponding to International Application No. PCT/SE2012/050531; dated Aug. 29, 2012.
International Search Report and Written Opinion Corresponding to International Application No. PCT/SE2012/050534; dated Sep. 3, 2012, 9 Pages.
Russian Official Action Corresponding to Russian Patent Application No. 2013156039; dated Apr. 19, 2016; 3 pages.

* cited by examiner

METHOD FOR MONITORING AND CONTROL OF TORREFACTION TEMPERATURE

CROSS REFERENCE TO RELATED APPLICATION

This application is a 35 U.S.C. § 371 national stage application of PCT International Application No. PCT/SE2012/050529, filed on 16 May 2012, which claims priority from Swedish Patent Application No. 1150461-0, filed May 18, 2011; the disclosures of which are hereby incorporated herein by reference in their entirety. The above-referenced PCT International Application was published in the English language as International Publication No. WO 2012/158114 A1 on 22 Nov. 2012.

TECHNICAL FIELD

The present invention relates to the field of torrefaction of biomass. In particular, it relates to a method and an arrangement for precise monitoring and control of torrefaction temperature, which enables accurate control of the quality and properties of the torrefied material.

BACKGROUND

To be able to compete with and replace fossil fuel energy carriers such as coal, oil and natural gas, lignocellulosic biomass would benefit from some form of pre-treatment method to overcome inherent drawbacks. The pre-treatment method torrefaction has been shown to improve biomass fuel qualities such as energy density, water content and milling, feeding and hydrophobic properties [1-4]. These improvements establish torrefaction as a key process in facilitating an expanding market for biomass raw materials. Torrefaction is a thermal pre-treatment method that normally takes place in an substantially inert (oxygen free) atmosphere at a temperature of about 220-600° C. During the process course a combustible gas comprising different organic compounds is produced from the biomass feedstock in addition to the torrefied biomass.

The process of producing a torrefied material from lignocellulosic biomass can be said to include four stages:
1) a drying step, wherein free water retained in the biomass is removed;
2) a heating step in which physically bound water is released and the temperature of the material is elevated to the desired torrefaction temperature;
3) a torrefaction stage, in which the material is actually torrified and which starts when the material temperature reaches about 220° C.-230° C. During this stage, the biomass partly decomposes and gives off different types of volatiles, such as hydroxy acetone, methanol, propanal, short carboxylic acids etc. In particular, the torrefaction stage is characterised by decomposition of hemicellulose at temperatures from 220° C.-230° C., and at higher torrefaction temperatures cellulose and lignin also starts to decompose and give off volatiles; cellulose decomposes at a temperature of 305-375° C. and lignin gradually decomposes over a temperature range of 250-500° C.;
4) a cooling step to terminate the process and facilitate handling. The torrefaction process is terminated as soon as the material is cooled below 220° C.-230° C.

SUMMARY OF THE PRESENT DISCLOSURE

The requirements for quality and properties of torrefied products differ considerably depending on the intended use of the product. The inventors have realized that it is crucial to be able to precisely control the torrefaction temperature in order to generate a torrefied product with desired characteristics. It is thus important to be able to measure the material temperature of a biomass in a torrefaction process in a correct and reliable manner. Currently, the temperatures in torrefaction processes are measured by methods relying on measuring the temperature of gases in the torrefaction arrangements or by measuring the surface temperature of the torrefaction reactor. The inventors have demonstrated that a measurement of the temperature of the gases in the torrefaction reactor or the surface temperature of the torrefaction reactor gives a false indication of the actual temperature of the biomass. Furthermore the difference between the gas temperature and the material temperature varies with the kind of lignocellulosic materials that is torrefied. The inventors have thus realized a need for improved methods for monitoring and controlling the process of torrefaction of biomass.

The inventors have solved the problem described above, with a method of monitoring a process of torrefaction of a biomass, wherein the surface temperature of the biomass in the torrefaction arrangement is determined. The invention further relates to a method of controlling a process of torrefaction of a biomass, comprising the steps of:

a) monitoring the surface temperature of a biomass in a torrefaction process to obtain a surface temperature value;

b) comparing the surface temperature value to a reference value; and if the surface temperature value is below the reference value, c1) increase a heating of the process, decrease a cooling of the process or increase a residence time of the biomass in the process; and/or if the surface temperature value is above the reference value, c2) decrease a heating of the process, increase a cooling of the process or decrease a residence time of the biomass in the process.

Another aspect of the invention relates to a torrefaction arrangement having a zone for heating and/or torrefaction, wherein a infrared thermometer is arranged at the zone such that surface temperature of material entering the zone, in the zone or leaving the zone can be measured and wherein a purge gas outlet is arranged at the IR thermometer such that purge gas may be supplied to the space between a lens of the IR thermometer and the material.

DEFINITIONS

Figure 1:
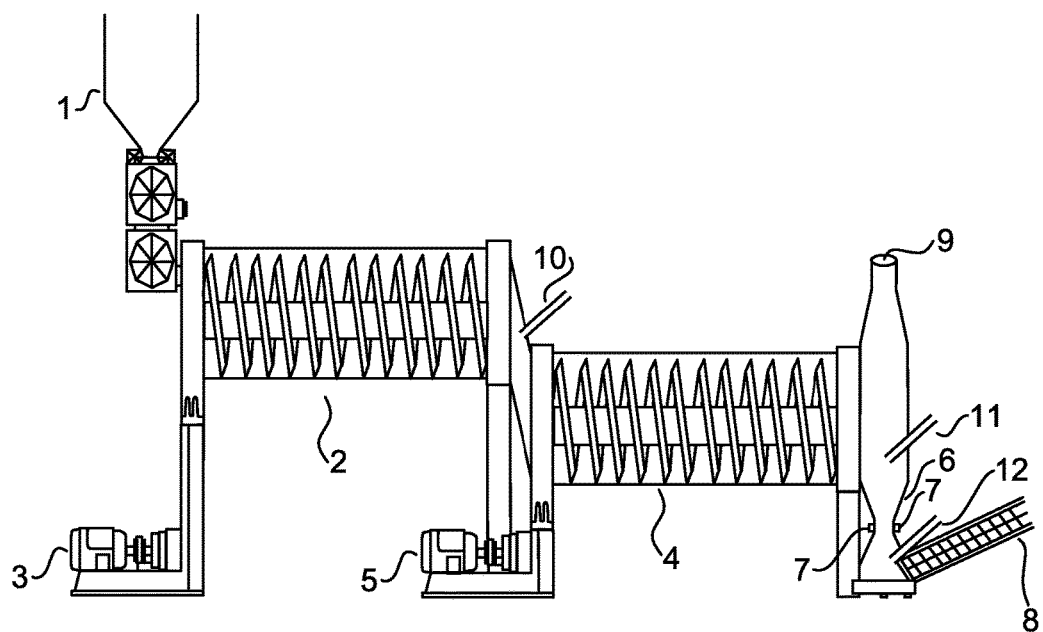
FIG. 1 shows a torrefaction arrangement comprising IR-thermometers for measurement of surface temperature in the torrefaction arrangement.

Torrefaction:

A thermal pre-treatment method that takes place in a virtually inert (oxygen-reduced or oxygen free) atmosphere at a temperature above 220° C. but below 600° C. and which produces a torrefied biomass and combustional gases. During a torrefaction stage, parts of the biomass, in particular hemicellulose, decompose and give off different types of organic volatiles. In a torrefaction process starting from raw biomass, the actual torrefaction stage is preceded by a drying stage wherein free water retained in the biomass is removed and by a heating stage wherein the biomass is heated to the desired torrefaction temperature.

Heating Zone:

A specific region of a compartment in a torrefaction arrangement, located upstream of a torrefaction zone in relation to a biomass inlet of a torrefaction arrangement, comprising means for specifically regulating the temperature in said specific region and wherein the temperature of a biomass is increased to a temperature near the desired torrefaction temperature prior to torrefaction.

Torrefaction Zone:

A specific region of a compartment in a torrefaction arrangement, located downstream of a heating zone in relation to a biomass inlet of a torrefaction arrangement, comprising means for specifically regulating the temperature in said specific region and wherein the temperature of a previously heated biomass is kept virtually constant at the desired torrefaction temperature for a desired torrefaction time wherein a desired torrefaction temperature is in a range between 220° C. to 600° C.

Connecting Zone

A specific region in a torrefaction arrangement located immediately upstream of a heating zone and immediately downstream of a torrefaction zone in relation to a biomass inlet of said torrefaction arrangement.

Torrefaction Time:

The time the temperature of the material is kept virtually constant at the torrefaction temperature. The residence time of the material in the torrefaction zone may be referred to as the torrefaction time.

DETAILED DESCRIPTION

Currently, the temperatures in torrefaction processes are measured by methods relying on measuring the temperature of gases in the torrefaction arrangements or by measuring the surface temperature of the torrefaction reactor. The inventors here demonstrate that these kinds of measurements give a false indication of the actual temperature of the biomass. Moreover, the difference between gas temperature and the actual material temperature is different depending on which kind of lignocellulosic materials that is torrefied. The inventors further demonstrate that measurement of the surface temperature of the biomass gives a reliable value of the actual material temperature and thus that this value can be used to control the torrefaction process and to generate torrefied material with desired characteristics, see example 1.

A first aspect of the invention thus relates to a method for monitoring a process of torrefaction of a biomass, characterized in that the surface temperature of the biomass in the torrefaction arrangement is determined.

In a second aspect the invention relates to method of controlling a process of torrefaction of a biomass, comprising the steps of:

a) monitoring the surface temperature to obtain a surface temperature value;

b) comparing the surface temperature value to a reference value; and if the surface temperature value is below the reference value, c1) increase a heating of the process, decrease a cooling of the process or increase a residence time of the biomass in the process; and if the surface temperature value is above the reference value, c2) decrease a heating of the process, increase a cooling of the process or decrease a residence time of the biomass in the process.

In one preferred embodiment the surface temperature of the biomass in the torrefaction arrangement is determined using an infrared (IR) thermometer such as a spot infrared thermometer or an infrared pyrometer. In one embodiment the IR-thermometer is cooled by a cooling media to avoid overheating of the IR-thermometer. The cooling media could either be in liquid phase or in gaseous phase. In one embodiment the cooling media is a liquid such as water or thermal oil and in another embodiment the cooling media is a gas or a gas mixture such as air.

The IR-thermometer preferably has a lens in the front, mainly to focus the IR beam but also to protect the internal electronics. The inventors have realized that condensable substances from the torrefaction gas may condense on the lens and interfere with the IR-radiation from the torrefied material. The inventors have further realized that several of the gases which the biomass gives off during the torrefaction process are IR-active. Thus, such gases may further disturb the IR thermometer measurement. Therefore, in one preferred embodiment a stream of inert non infrared active gas is supplied in the space between the lens of the IR thermometer and the biomass, to remove the IR-active gases, and to prevent condensation of condensable substances in the torrefaction gas on the lens.

Furthermore, the inventors have realized that if the inert non infrared active gas is not hot enough, condensable substances in the torrefaction gas may condense in the space between the lens of the IR-thermometer and the biomass. Therefore, in order to get a reliable measurement the non infrared active gas should be heated before it is introduced in the space between the lens of the IR thermometer and the biomass. Therefore, in another preferred embodiment the temperature of the inert non infrared active gas at the purge gas outlet is above 150° C., such as above 200° C., such as above 250° C. such as above 300° C., such as above 350° C., such as above 400° C., such as above 450° C. Preferably, the temperature of the inert gas in the space between the IR thermometer and the biomass is high enough to avoid condensation of torrefaction gases and to avoid cooling of the biomass. Still the temperature of the gas should not be so high that it heats the temperature of the biomass in the torrefaction process. Preferably the temperature of the inert gas in the space between the IR thermometer and the biomass is close to the torrefaction temperature, such as in the range of 150° C. to 750° C., such as 220° C. to 750° C., such as 220° C. to 700° C., such as 220° C. to 600° C., such as 220-500, such as 220-450, such as 220-400, such as 230-600, such as 230-500, such as 230-450, such as 230-400, such as 240-500° C., such as 240-400° C., such as 240-350° C. such as 270-350° C. Most preferably the temperature of the inert gas in the space between the IR thermometer and the biomass is about 30° C. higher than the surface temperature of the biomass at the moment of temperature measurement, such as 5-50° C. higher, such as 10-50° C. higher, such as 10-40° C. higher, such as 20-40° C. higher. In one preferred embodiment the inert non infrared active gas is nitrogen gas or a noble gas. In a less preferred embodiment, a gas which is not completely IR-inactive but has a low infrared activity within the IR thermometers spectral range is used instead of the inert non infrared active gas. Examples of such a gas are $CO_2$, $NO_2$, CO, NO, steam, and different mixtures of said gases.

The amount of introduced inert non infrared active gas should be high enough to remove the IR-active gases, and to prevent condensation of condensable substances in the torrefaction gas on the lens. Said amount of inert non infrared active gas will vary depending on the torrefaction arrangement, the arrangement of the IR thermometer and the torrefaction temperature, but may at a pressure of 1 ATM for example be in the range of 2-100 l/min such as 2-50 l/min, such as 5-100 l/min, such as 5-50 l/minutes such as 5-25 l/min.

In another embodiment the surface temperature of the biomass at the moment of temperature measurement is in the range of 220° C. to 600° C., such as 220-500° C., such as 220-450, such as 220-400, such as 230-600, such as 230-500, such as 230-450, such as 230-400, preferably 240-500° C., preferably 240-400° C., preferably 240-350° C. most preferably 270-350° C. In one preferred embodiment the biomass is represented by lignocellulosic biomass.

Another aspect of the invention relates to a torrefaction arrangement having a zone for heating and/or torrefaction, wherein a infrared thermometer is arranged at the zone such that surface temperature of material entering the zone, in the zone or leaving the zone can be measured and wherein a purge gas outlet is arranged at the IR thermometer such that purge gas (inert non infrared active gas) may be supplied to the space between a lens of the IR thermometer and the material. In one embodiment, the lens of the infrared thermometer and the purge gas outlet are arranged in a common open-ended pipe, which extends into the zone such that the open end faces the material. Thus, the purge gas will flow out through the open end of the pipe during operation.

In one other embodiment the torrefaction arrangement comprises at least one heating zone and at least one torrefaction zone and the torrefaction arrangement comprises material transport arrangements such as that the residence time of the material in the torrefaction zone(s) can be controlled separately from the residence time in the heating zone(s) and wherein the torrefaction zone(s) is/are located in a different compartment than the heating zone(s) and wherein the two compartments are connected by a connecting zone and wherein the infrared thermometer is arranged in said connecting zone.

In one embodiment the infrared thermometer is a spot infrared thermometer or an infrared pyrometer.

In another embodiment the material transport in the connecting zone is mediated by gravity or by mechanical measures. In another embodiment the connecting zone is located in a compartment of the torrefaction arrangement which is not represented by a rotating compartment. In one embodiment the material transport in the connecting zone is not mediated by rotation of the compartment inclosing the connecting zone. In one embodiment the purge gas outlet is connected to a gas cylinder comprising the said inert non infrared active gas. In another embodiment the said cylinder comprises nitrogen gas or a noble gas.

DETAILED DESCRIPTION OF EXEMPLARY EMBODIMENTS

FIG. 1 shows a torrefaction arrangement having a biomass inlet (1), a heating zone (2) (arranged in a drum) where the material is heated to a temperature near the torrefaction temperature and a torrefaction zone (4) (also arranged in a drum) where the biomass is torrefied. The transport of the biomass in the heating zone (2) is mediated by a heating zone transport screw which is driven by a heating zone transport screw engine (3). The transport of the biomass in the torrefation zone (4) is mediated by a torrefation zone transport screw which is driven by torrefation zone transport screw engine (5). The transport screw engines (3,5) may be arranged to rotate the whole drums, in which case the screws are fixed to the drums, or only the screws. Torrefied material leaves the torrefaction zone through a biomass exit (6) and is thereafter quench cooled at the means for quench cooling (7), such as water application devices, and further cooled by means for further cooling (8) which can be a screw cooler. Torrefaction gases from the heating zone (2) and torrefaction zone (4) is collected from the torrefaction gas outlet (9) for combustion or processing. The surface temperature of the biomass within the torrefaction arrangement is measured at different positions within the torrefaction arrangement using IR-thermometers (10, 11, 12). A first IR-thermometer (10) is arranged in the connection zone located in between the heating zone and the torrefaction zone. This IR-thermometer can be adjusted to measure the surface temperature of the biomass in the end of the heating zone, in the connection zone or in the beginning of the torrefaction zone. A second IR-thermometer (11) is located in the biomass exit (6) and can be adjusted to measure the surface temperature of the biomass in the biomass exit or in the end of the torrefaction zone. A third IR-thermometer (12) is located after the means for quench cooling (7) and prior to the means for further cooling (8). This IR-thermometer can measure the surface temperature of the quench cooled biomass prior to the further cooling.

Figure 2:
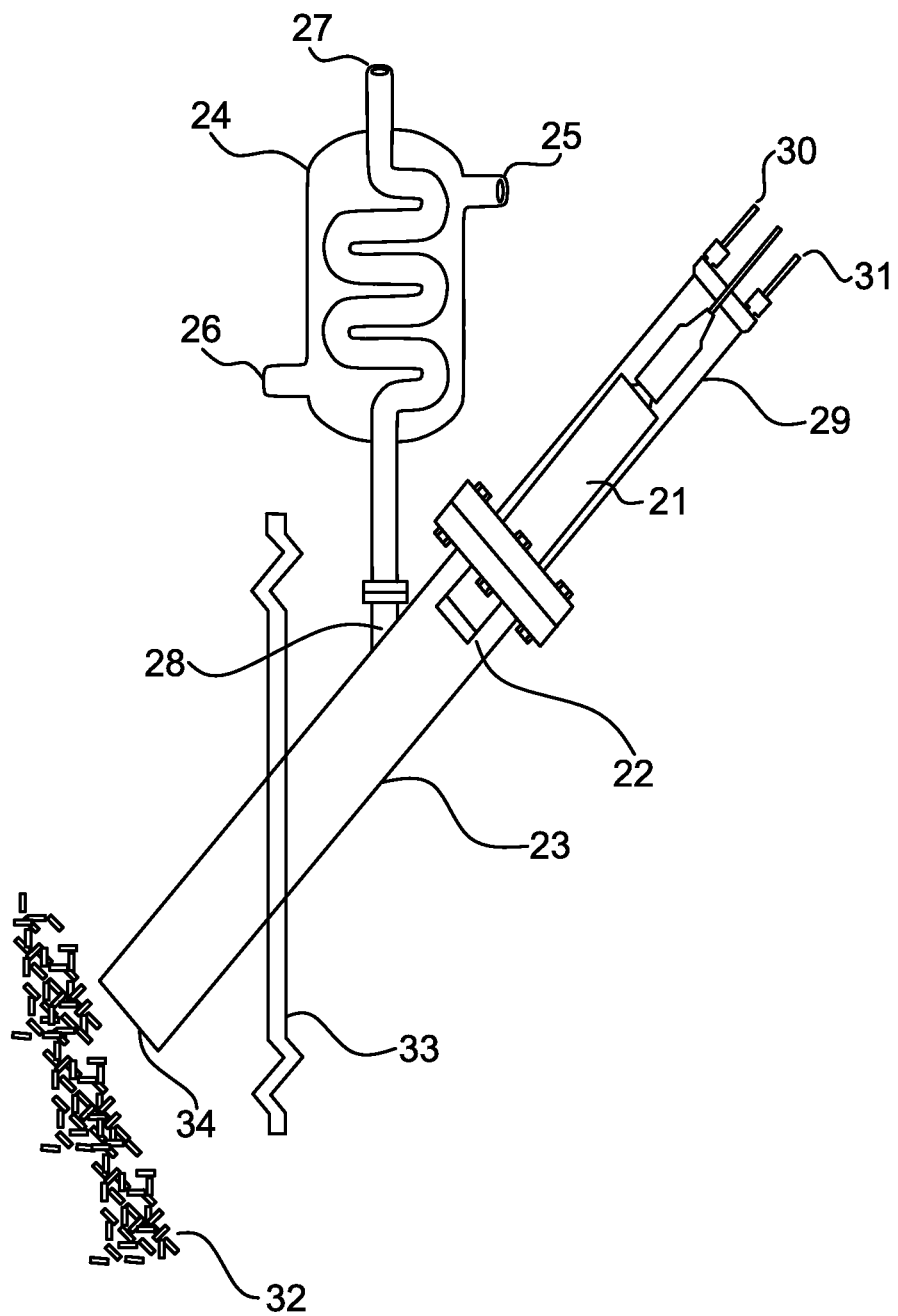
FIG. 2 shows an IR-thermometer and a purge gas outlet arranged in a common open-ended pipe, for measurement of surface temperature in a torrefaction arrangement.

FIG. 2 shows an IR-thermometer (21) for measuring the temperature of a biomass (32), such as wood chips, in a torrefaction arrangement. The IR thermometer (21) comprises a lens (22) in the front, mainly to focus the IR beam but also to protect the internal electronics. The lens (22) is located in an open-ended pipe (23) which extends into the interior of the torrefaction arrangement, such as into a torrefaction zone, through a torrefaction arrangement wall (33), such that the open end (34) of the pipe (23) faces the biomass (32). A stream of inert non infrared active purge gas is introduced in a purge gas inlet (27) of a purge gas heater (24). Before the gas enters the open-ended pipe (23) via a purge gas outlet (28), the gas is heated to above 150° C. in the purge gas heater (24). The purge gas heater (24) comprises a heating media inlet (25) and a heating media outlet (26). The purge gas flows through the open-ended pipe (23) and may be further heated by the heat in the torrefaction arrangement as it moves towards the open end (34). —At the open-end (34) of the open-ended pipe (23) the temperature of the purge gas is normally close to the torrefaction temperature. When the purge gas enters the space in between the biomass (32) and the open end (34), IR-active gases given off from the biomass (32) are displaced and the surface temperature of the biomass (32) is detected by the IR-thermometer (21). To avoid overheating of the IR-thermometer (21), the IR-thermometer (21) is cooled by introduction of a cooling media in to a cooling zone (29) of the IR-thermometer (21) through a cooling media inlet (31). Cooling media exits the cooler (29) through a cooling media outlet (30).

Figure 3:
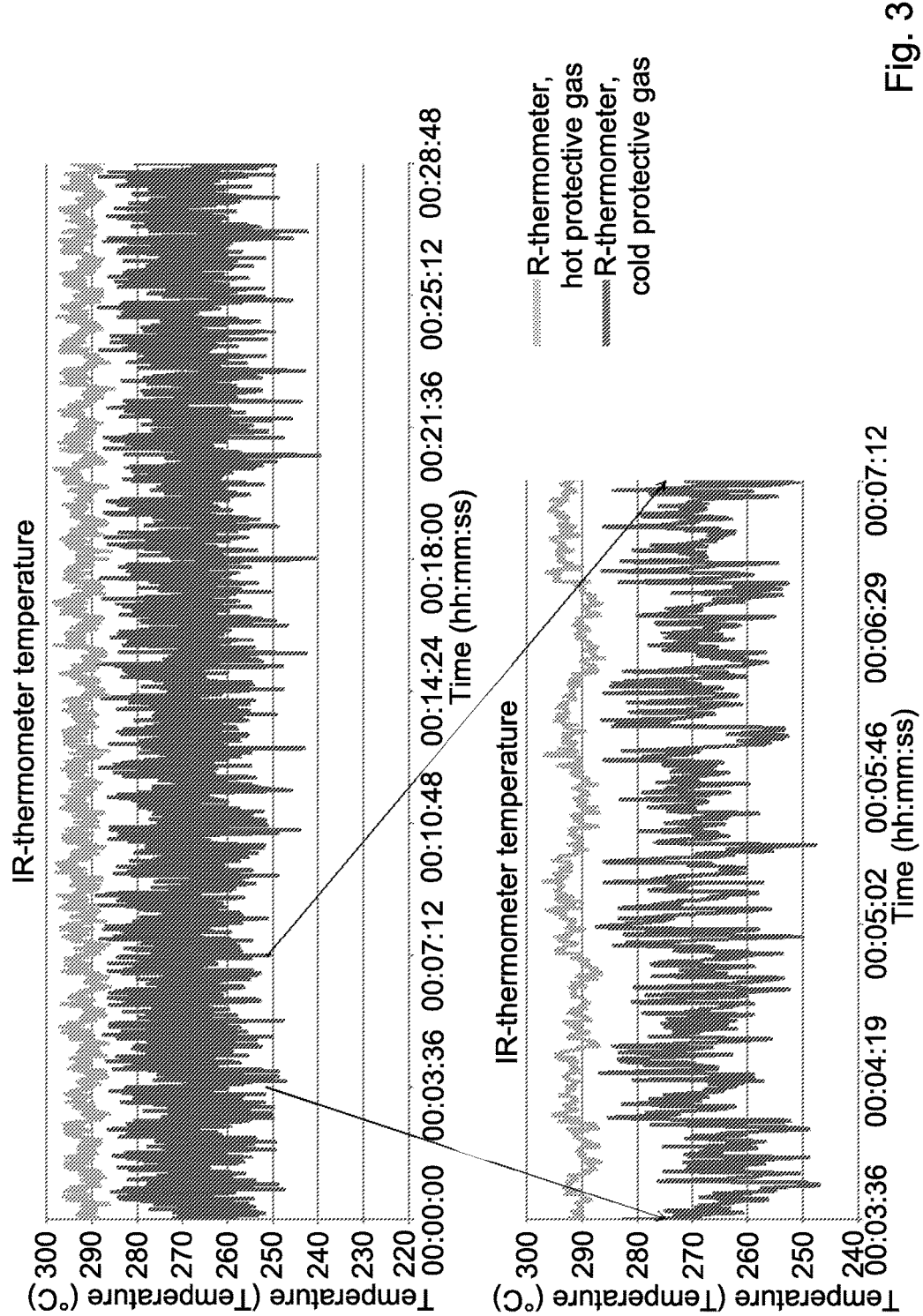
FIG. 3 shows IR-thermometer measurements made during the same torrefaction run, at steady-state conditions using cold nitrogen gas or hot nitrogen gas to remove IR-active gases, and to prevent condensation of condensable substances in the torrefaction gas.

FIG. 3 shows IR-thermometer measurements made during the same torrefaction run, at steady-state conditions using hot and cold nitrogen gas to remove IR-active gases, and to prevent condensation of condensable substances in the torrefaction gas. It is demonstrated that IR-thermometer measurements are much more precise when the protective gas is hot. The average temperature of the cold gas measurements is lower than that of the hot gas measurements, probably because of the condensation of substances in the torrefaction gas when the cold gas is employed.

EXAMPLES

Example 1

| Biomass | Residence time (min) | Set point temperature (° C.) | Atmosphere temperature (° C.) | Reactor surface (° C.) | Temp IR - thermometer (° C.), cold protection gas | Temp IR - thermometer (° C.), hot protection gas | Diff #1 * (° C.) | Diff #2 ** (° C.) | Diff #3 *** (° C.) |
|---|---|---|---|---|---|---|---|---|---|
| Spruce | 25 | 300 | 329 | 332 | 300 | 318 | −11 | −14 | 18 |
| Spruce | 16.5 | 270 | 277 | 294 | 271 | 273 | −4 | −21 | 2 |
| Eucalyptus | 16.5 | 270 | 267 | 272 | — | 269 | 2 | −4 | |
| Eucalyptus | 8 | 270 | 272 | 300 | — | 271 | −1 | −29 | |

* Diff #1 = IR-thermometer (with hot protective gas) - Atmosphere temperature
** Diff #2 = IR-thermometer (with hot protective gas) - Reactor surface temperature
*** Diff #3 = IR-thermometer (with hot protective gas) - IRT (with cold protective gas)

The table above shows results from four different torrefaction experiments performed in a continuous torrefaction pilot plant with a rotating drum as a reactor. During the same experiment the atmosphere temperature (i.e. the temperature of the gases in the torrefaction reactor), the reactor wall surface temperature and the biomass surface temperature was measured. Atmosphere temperature was measured 10 cm from the reactor end and about 5-10 cm up from the biomass with an thermocouple type N. Reactor surface temperature was measured outside of the rotating reactor with thermocouple type N. Biomass surface temperature was measured with an IR-thermometer (Heitronics CT09, spectral range 8-14 μm), in all cases with hot nitrogen gas and in two cases also with cold nitrogen gas.

Conclusion 1: Diff #1 in the table shows that atmosphere temperature (i.e. the temperature of the gases in the torrefaction reactor) is not useful for determine torrefaction temperature because the measurement deviates irregularly from the biomass surface temperature (IR-thermometer with hot nitrogen gas).

Conclusion 2: Diff #2 shows that measurement of reactor surface temperature is not useful for determine torrefaction temperature because the measurement deviates irregularly from the biomass surface temperature (IR-thermometer with hot nitrogen gas)

Conclusion 3: Diff #3 shows that the IR-thermometer measurement deviates irregularly between hot and cold nitrogen gas. Together with the information in example 2 it is clear that the use of hot nitrogen gas is to be preferred over cold nitrogen gas for determination of torrefaction temperature.

Example 2

FIG. 3 shows IR-thermometer measurements made during the same torrefaction run, at steady-state conditions. Cold gas measurements were made approximate 3 h before the hot gas measurements. Cold gas has a temperature of 30° C. and the hot gas is in this case about 320° C. at the purge gas outlet. Use of cold nitrogen gas gives an uncertainty of about 40-50° C. and the measurement can differ up to 32° C. between each 10 ms reading. While using hot gas limits the measuring span to below 10° C. and the measurement can differ up 6° C. between each 10 ms reading. Most of the temperature span when using hot gas can be attributed to the fact that the IR-thermometer at some seconds each rotation of the drum is measuring on the steel drum and not on torrefied wood. The cold gas is cooling the torrefaction gas so that condensable substances condense in the gas and thereby give false readings. From the experiments described above it is clear that IR-thermometer measurements are much more precise when the nitrogen gas is hot and therefore is it possible to explain most of the variation in the measurement. The average of cold gas measurement is lower than for the hot gas measurement probably because of the condensable substances in the torrefaction gas.

REFERENCES

[1] M. J Prins et al. More efficient biomass gasification via torrefaction. Energy 2006, 31, (15), 3458-3470.
[2] P. C. A. Bergman et al. Torrefaction for Entrained Flow Gasification of Biomass; Report C—05-067; Energy Research Centre of The Netherlands (ECN): Petten, The Netherlands, July 2005;
[3] K. Håkansson et al. Torrefaction and gasification of hydrolysis residue. 16th European biomass conference and exhibition, Valencia, Spain. ETAFlorence, 2008.
[4] A. Nordin, L. Pommer, I. Olofsson, K. Håkansson, M. Nordwaeger, S. Wiklund Lindström, M. Broströn, T. Lestander, H. Örberg, G. Kalén, Swedish Torrefaction R&D program. First Annual Report 2009-12-18 (2009).

The invention claimed is:

1. A method for monitoring a process of torrefaction of a biomass, the method comprising:
    positioning an IR-thermometer having a lens in a pipe having an open end that extends into an interior of a torrefaction arrangement, the lens of the IR-thermometer facing the open end of the pipe and the biomass;
    determining a surface temperature of the biomass in a torrefaction arrangement using the IR-thermometer;
    supplying a stream of inert non-infrared active gas in the space between a lens of the IR-thermometer and the biomass and wherein the temperature of the inert non-infrared active gas at a purge gas outlet is above 150° C.

2. A method of controlling a process of torrefaction of a biomass, comprising the steps of:
    a) monitoring the surface temperature according to claim 1 to obtain a surface temperature value;
    b) comparing the surface temperature value to a reference value; and if the surface temperature value is below the reference value,
       c1) increase a heating of the process, decrease a cooling of the process or increase a residence time of the biomass in the process; and/or if the surface temperature value is above the reference value, c2) decrease a heating of the process, increase a cooling of the process or decrease a residence time of the biomass in the process.

3. A method according to claim 1 wherein the inert non-infrared active gas is nitrogen gas or a noble gas.

4. A method according to claim 3 wherein the inert non-infrared active gas is nitrogen gas.

5. A method according to claim 1 wherein the surface temperature of the biomass at the moment of temperature measurement is in the range between 220° C. and 600° C.

6. A method according to claim 1 wherein the biomass is lignocellulosic biomass.

7. A method according to claim 1, wherein the stream of inert non-infrared active gas in the space between the lens of the IR-thermometer and the biomass is sufficient to reduce IR-active gases in the space between the lens of the IR-thermometer and the biomass and to reduce condensation of condensable substances in the torrefaction gas on the lens of the IR-thermometer.

8. A method according to claim 1, further comprising introducing a cooling media in a cooling zone of the IR-thermometer, wherein the cooling zone is in a region of the pipe opposite the lens.

9. A method for monitoring a process of torrefaction of a biomass, the method comprising:
   positioning an IR-thermometer having a lens in a pipe having an open end that extends into an interior of a torrefaction arrangement, the lens of the IR-thermometer facing the open end of the pipe and the biomass;
   heating an inert non-infrared active gas to a temperature above 150° C. to thereby provide a heated inert non-infrared active gas;
   supplying a stream of the heated inert non-infrared active gas at a temperature above 150° C. to a space between the lens of the IR-thermometer and the open end of the pipe; and
   determining the surface temperature of the biomass in a torrefaction arrangement using the IR-thermometer facing the open end of the pipe and the biomass.

\* \* \* \* \*